US005296707A

United States Patent [19]

Nozu

[11] Patent Number: 5,296,707

[45] Date of Patent: Mar. 22, 1994

[54] APPARATUS FOR DETECTING MOVEMENT OF HEAT SOURCE

[75] Inventor: Shinya Nozu, Kyoto, Japan

[73] Assignee: Murata Mfg. Co., Ltd., Kyoto, Japan

[21] Appl. No.: 888,153

[22] Filed: May 26, 1992

[30] Foreign Application Priority Data

Jun. 3, 1991 [JP] Japan ............................ 3-041141[U]

[51] Int. Cl.[5] ............................ G01J 5/08; G01K 7/07

[52] U.S. Cl. .................................... 250/353; 250/342; 250/349

[58] Field of Search ......................... 250/342, 353, 349

[56] References Cited

U.S. PATENT DOCUMENTS

| | | | |
|---|---|---|---|
| 4,734,585 | 3/1988 | Owers | 250/349 |
| 4,831,259 | 5/1989 | Meixner et al. | 250/353 |
| 4,912,331 | 3/1990 | Owers | 250/342 |
| 4,963,749 | 10/1990 | McMaster | 250/349 |
| 4,965,453 | 10/1990 | Hoschette et al. | 250/349 |
| 5,134,292 | 7/1992 | Segawa et al. | 250/342 |

FOREIGN PATENT DOCUMENTS

| | | | |
|---|---|---|---|
| 63-247684 | 10/1988 | Japan | 250/342 |
| 2178532 | 2/1987 | United Kingdom . | |
| 2248936 | 4/1992 | United Kingdom . | |

*Primary Examiner*—Carolyn E. Fields
*Assistant Examiner*—Drew A. Dunn
*Attorney, Agent, or Firm*—Oliff & Berridge

[57] ABSTRACT

In order to detect the movement of a heat source over a widened range by using a reduced number of pyroelectric type infrared sensors, a sensor section includes two infrared detecting means X and Y. The area to be observed by the infrared detecting means X is divided into two zones A and B while the area to be observed by the infrared detecting means Y is divided into two single zones a and b. The single zones A and a are overlapped on each other to form an overlap zone (A, a). The movement of the heat source between the single zone B and the single zone b, between the overlap zone (A, a) and the single zone B and between the overlap zone (A, a) and the single zone b is judged to detect the movement of the heat source over the entire area to be observed by the sensor section. In such a manner, two infrared detecting means can cover three zones to be observed.

10 Claims, 4 Drawing Sheets

| (I) \ (II) | 1 | 0 |
|---|---|---|
| 1 | A.a | B.C |
| 0 | b.c | — |
FIG. 4
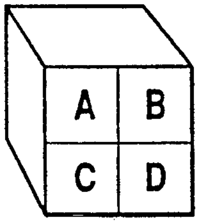
FIG. 5(a)
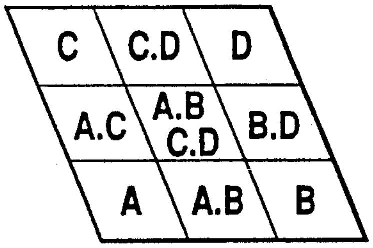
FIG. 5(b)

APPARATUS FOR DETECTING MOVEMENT OF HEAT SOURCE

BACKGROUND OF THE INVENTION

1. Field of the Invention

The present invention relates to an apparatus for detecting the movement of a heat source and particularly to such an apparatus utilizing a pyroelectric type infrared detector.

2. Description of the Related Art

When a certain dielectric is heated, the surface thereof produces a voltage or increases the electric charge thereon, so that the thermal energy is converted into an electric energy. Such a phenomenon is generally called "pyroelectric effect". Materials providing the pyroelectric effect are called "pyroelectric materials".

Many of such pyroelectric materials are ceramics. Pyroelectric type infrared sensors made from such pyroelectric materials have been used in systems for detecting the movement of a heat source. The heat source to be detected by the pyroelectric type infrared sensors is normally a person's body. The pyroelectric type infrared sensors are utilized in various applications such as an air conditioner capable of changing its wind direction depending on the movement of the person's body or a lighting equipment capable of changing its orientation depending on the movement of the person's body.

In order to detect the movement of the person's body, a heat source movement detecting system which utilizes a plurality of such pyroelectric type infrared sensors and which is constructed in accordance with the prior art has such a mechanism as is shown in FIG. 1.

Referring to FIG. 1, the system comprises a pyroelectric type infrared sensor 10*a* having an area to be observed which will be called "area A", a pyroelectric type infrared sensor 10*b* having an area B to be observed and pyroelectric type infrared sensor 10*c* having an area C to be observed. If each of these pyroelectric type infrared sensors, for example, the sensor 10*a* detects (+1), it means that a person has entered the area A. If the pyroelectric type infrared sensor 10*a* detects (−1), it represents that the person has exited the area A.

Although the pyroelectric type infrared sensor 10*a* can satisfactorily sense the entrance and exit of the heat source into and from the area A, it cannot sense the movement of the heat source within the area A except when any change in temperature occurs due to the movement of the heat source.

In order to avoid such a limitation, the other areas B and C are provided in the prior art in addition to the area A, as shown in FIG. 1. If the heat source moves from the area A to the area B, the temperature in the area A falls while the temperature in the area B rises. The fall and rise of temperature can be sensed by the pyroelectric type infrared sensors 10*a* and 10*b*. Thus, the system will judge that the heat source moved from the area A to the area B. Similarly, if the fall of temperature in the area B is simultaneously sensed with the rise of temperature in the area C, the system will judge that the heat source moved from the area B to the area C. Furthermore, if the fall of temperature in the area C is simultaneously sensed with the rise of temperature in the area A, the system will judge that the heat source moved from the area C to the area A.

In such a manner, the system can sense the movement of the heat source within a room when the plurality of pyroelectric type infrared sensors located in the room at the respective areas detect the movement of the heat source between the areas.

As described hereinbefore, however, the prior art system cannot detect the movement of the heat source in each of the areas A, B and C unless any change in temperature is involved by the movement of the heat source. In order to increase the degree of accuracy in measurement, it is required that each of the areas is reduced and also the number of pyroelectric type infrared sensors is increased. This will increase the entire size of the system and also the manufacturing cost.

SUMMARY OF THE INVENTION

It is therefore an object of the present invention to provide an improved apparatus capable of detecting the movement of a heat source in the same room without increasing the number of pyroelectric type infrared sensors.

To this end, the present invention provides an apparatus for detecting the movement of a heat source, comprising areas to be observed by a plurality of pyroelectric type infrared sensors, each of the areas being divided into a plurality of single zones by Fresnel lens means. The apparatus also comprises overlapping means for overlapping the single zones belonging to each of the different pyroelectric type infrared sensors to form an overlap zone and a zone discriminating circuit for discriminating the movement of the heat source in each of the zones responsive to the information of detection from the pyroelectric type infrared sensors, whereby the movement of the heat source can be detected between the overlapped zones, between a single zone and the overlapped zone and between two single zones covered by different pyroelectric type infrared sensors.

In such an arrangement, each of the areas to be observed by the pyroelectric type infrared sensors is divided into a plurality of zones by the Fresnel lens means. Several zones divided by the Fresnel lens means are overlapped by the overlapping means to form an overlapped zone and a single zone.

The zone discriminating circuit identifies the movement of the heat source between the different overlapped zones, between a single zone and the overlapped zone and between two different single zones such that the movement of the heat source over the entire area to be observed by the pyroelectric type infrared sensors can be detected by the apparatus. If a sensor section includes a predetermined number of infrared sensors, zones to be observed which exceed in number the pyroelectric type infrared sensors, can be provided within the areas to be observed by said sensor section. This means that the number of pyroelectric type infrared sensors in the entire system can be reduced for detecting the movement of the heat source.

More particularly, the present invention is a heat source movement detecting system comprising a sensor section including a plurality of infrared detecting means for detecting a change in temperature in a heat source; means for dividing the area to be observed by the infrared detecting means into a plurality of zones; means for overlapping the zones to form overlap zones each consisting of a plurality of the zones and single zones without overlapping; and discriminating means for judging the movement of the heat source between different overlap zones, between a single zone and an overlap zone and between different single zones, the heat source movement detecting system being adapted to detect the movement of the heat source over the entire area to be observed by the sensor section by judging the movement of the heat source between different overlap zones, between a single zone and an overlap zone and between different single zones.

BRIEF DESCRIPTION OF THE DRAWINGS

FIG. 4 illustrates the combination of zones in the embodiment of FIGS. 1 and 2.

FIGS. 5(*a*) and 5(*b*) illustrate the division and overlap of zones in another embodiment of the present invention.

DETAILED DESCRIPTION OF THE PREFERRED EMBODIMENTS

Figure 1:
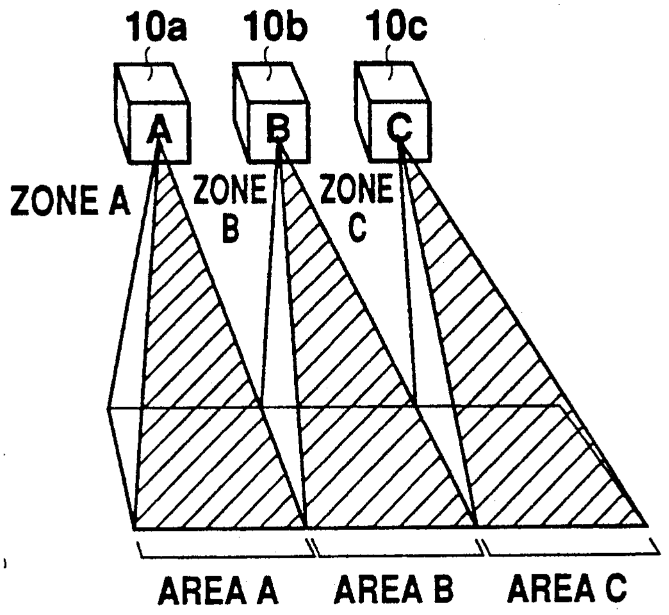
Fig. 1 PRIOR ART
FIG. 1 is a schematic view of a heat source movement detecting system constructed in accordance with the prior art.
Figure 2:
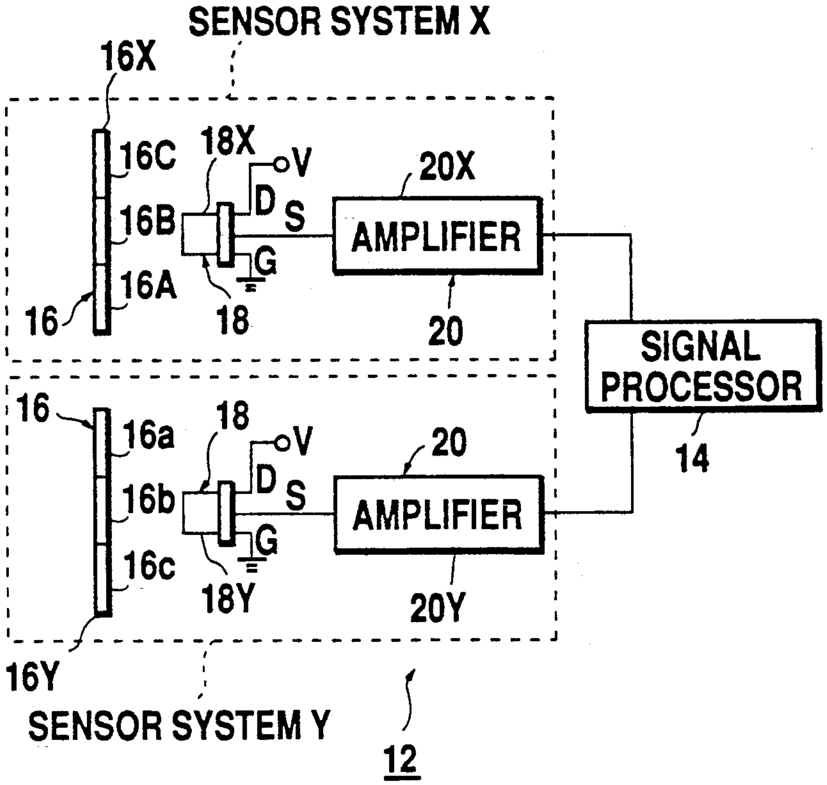
FIG. 2 is a block diagram of one embodiment of a heat source movement detecting system constructed in accordance with the present invention.

Referring to FIG. 2, there is shown a heat source detecting system which comprises a sensor section 12, with Fresnel lenses 16, infrared sensors 18 and amplifiers 20, for receiving infrared rays and for sensing changes in the infrared rays received, and a signal processing section 14 for receiving and processing signals from the sensor section 12. The sensor section 12 comprises a sensor system X and a sensor system Y. The sensor system X comprises a Fresnel lens 16X, a pyroelectric type infrared sensor 18X and an amplifying circuit 20X while the sensor system Y comprises a Fresnel lens 16Y, a pyroelectric type infrared sensor 18Y and an amplifying circuit 20Y.

In the sensor system X, the Fresnel lens 16X is divided into three sections 16A, 16B and 16C. The Fresnel lens 16Y of the sensor system Y is also divided into three sections 16*a*, 16*b* and 16*c*.

In such an arrangement, infrared rays are inputted into the pyroelectric type infrared sensors 18X and 18Y through the Fresnel lens sections 16A, 16B, 16C and 16*a*, 16*b*, 16*c*, respectively.

Each of the pyroelectric type infrared sensors 18X and 18Y is connected to a constant voltage source. Any change in infrared rays detected by the pyroelectric material in the pyroelectric type infrared sensor 18X or 18Y is converted into a change in voltage which in turn is applied to the corresponding amplifying circuit 20X or 20Y. When signals amplified by the respective amplifying circuits 20X and 20Y are provided to the signal processing section 14, the movement of a heat source will be judged from various changes in infrared rays in the following manner.

Figure 3:
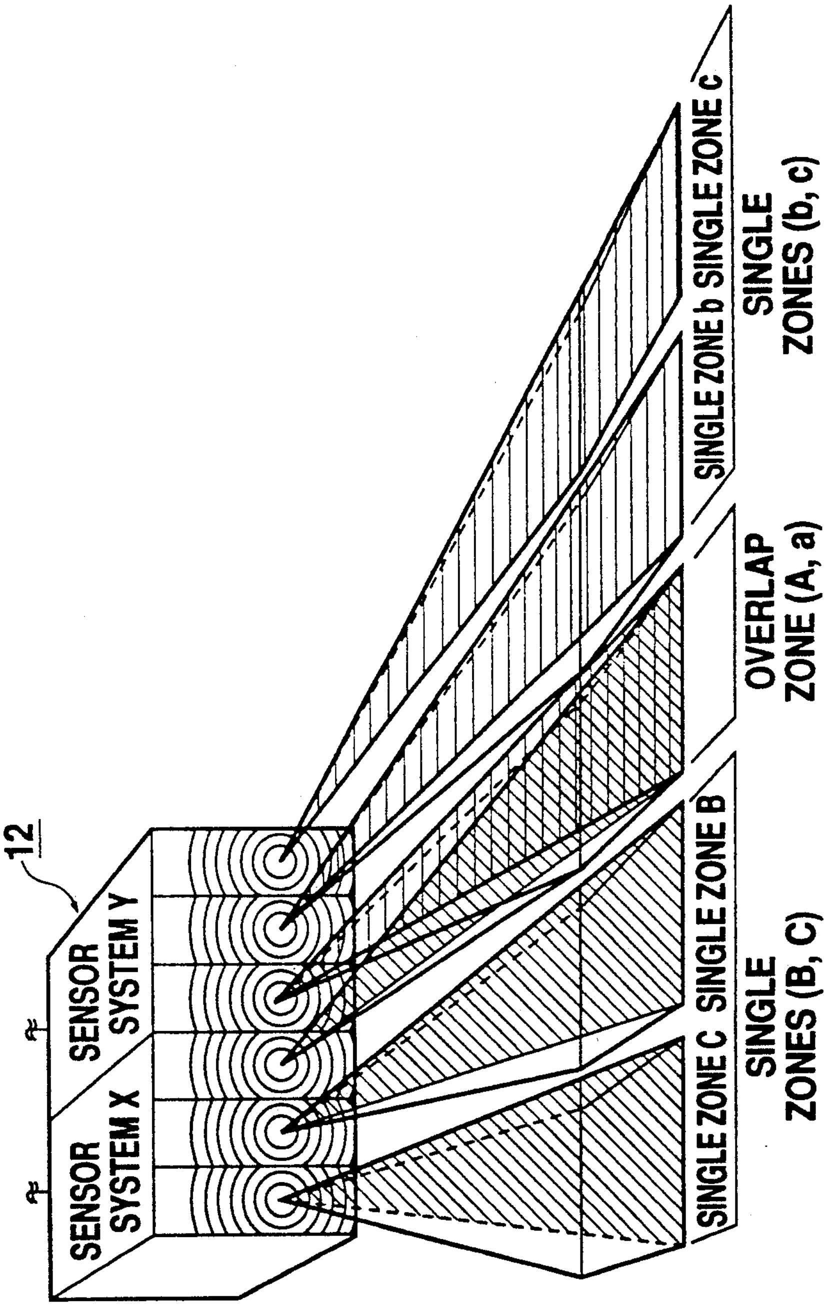
FIG. 3 illustrates the function of the heat source movement detecting system shown in FIG. 2.

Referring to FIG. 3, an area to be observed by the sensor system X with respect to change in infrared rays is divided into zones A, B and C through the Fresnel lens sections 16A, 16B and 16C, respectively. On the other hand, an area to be observed by the sensor system Y with respect to change in infrared rays is divided into zones a, b and c through the Fresnel lens sections 16*a*, 16*b* and 16*c*, respectively. The zones A and a are overlapped to form an overlap zone. Each of the remaining zones are called "a single zone".

FIG. 4 illustrates how the heat source movement detecting system of the present invention judges the movement of the heat source between a single zone and the overlap zone. If the sensor system X detects "1", it represents that the pyroelectric type infrared sensor 18X has detected a change in temperature. If the sensor system X detects "0", it shows that no change in temperature has been detected by the same pyroelectric type infrared sensor. This is true of the sensor system Y.

As will be apparent from the above description, the sensor systems X and Y simultaneously detect a change in temperature if the heat source moves to the overlap zone (A, a) from any other zone. On the contrary, if the heat source moves to the single zone B or C from any other zone, the sensor system X detects a change in temperature while the sensor system Y detects no change in temperature. If the heat source moves from the single zone b or c from any other zone, the sensor system Y detects a change in temperature while the sensor system X detects no change in temperature.

If both the sensor systems X and Y detect a change in temperature, the heat source movement detecting system judges the movement of the heat source to the overlap zone (A, a) from any other zone. If only the sensor system Y detects the change in temperature, the heat source movement detecting system judges the movement of the heat source to the single zone (b, c) from any other zone. If only the sensor system X detects the change in temperature, the heat source movement detecting system judges the movement of the heat source to the single zone (B, C) from any other zone.

More particularly, in principle, the signal processing section 14 discriminates the movement of the heat source to the single zone (B, C) from any other zone if $(X)=(+1)$ and $(Y)=(\pm 0)$; the movement of the heat source from the single zone (B, C) to any other zone if $(X)=(-1)$ and $(Y)=(\pm 0)$; the movement of the heat source to the single zone (b, c) from any other zone if $(X)=(\pm 0)$ and $(Y)=(+1)$; the movement of the heat source from the single zone (b, c) to any other zone if $(X)=(\pm 0)$ and $(Y)=(-1)$; the movement of the heat source to the overlap zone (A, a) from any other zone if $(X)=(+1)$ and $(Y)=(+1)$; and the movement of the heat source from the overlap zone (A, a) to any other zone if $(X)=(-1)$ and $(Y)=(-1)$.

For example, if the heat source moves from the single zone (B, C) to the overlap zone (A, a), the sensor system X does not detect the change in temperature while the sensor system Y detects the change in temperature. In such a case, the heat source movement detecting system judges the movement of the heat source from the single zone (B, C) to the overlap zone (A, a) since (Y) becomes $(+1)$ while (X) remains $(\pm 0)$. If the heat source moves from the overlap zone (A, a) to the single zone (b, c), the sensor system Y does not detect the change in temperature while the sensor system X detects the change in temperature. In such a case, the heat source movement detecting system judges the movement of the heat source from the overlap zone (A, a) to the single zone (b, c) since (X) becomes $(-1)$ while (Y) remains $(\pm 0)$. If the heat source moves from the single zone (B, C) to the single zone (b, c), both the sensor systems X and Y detect the changes in temperature. Since (X) and (Y) respectively become $(-1)$ and $(+1)$, the movement of the heat source between the different single zones, that is, between the single zones (B, C) and (b, c) is detected by the heat source movement detecting system.

In such a manner, the two sensor systems X and Y in the heat source movement detecting system can sense changes in temperature at three areas (B, C), (b, c) and (A, a).

However, there is a spacing between the single zones B and C which cannot be detected by the infrared sensors. If the heat source moves from the single zone B to the single zone C, the value of (X) will change sequentially from (−1) through (±0) to (+1). Such a spacing which is out of the range of detection can be modified depending on the form of application.

The aforementioned embodiment of the present invention has been described as to three Fresnel lens sections and three zones for each sensor system. If a plurality of infrared sensor systems are used as in this embodiment, such an arrangement is advantageous in that the extreme end zones C and c can be overlapped with zones in another infrared sensor system. If one room can be covered by three zones, the extra zones C and c can be omitted.

The present invention is not limited to three divided zones but may be similarly applied to four divided zones A, B, C and D, as shown in FIG. 5(*a*). If the four divided zones are combined as shown in FIG. 5(*b*), the movement of the heat source may be detected more finely.

It is thus to be understood that the present invention may be applied to all possible combination and/or division with respect to zones to be detected.

As will be apparent from the foregoing, the present invention provides the overlap zone in addition to the single zone such that the zones to be observed exceeding in number the infrared sensors can be located within an area to be observed by the heat source movement detecting system. Thus, the movement of the heat source can be detected by using the reduced number of infrared sensors. This results in reduction of the size of the entire heat source movement detecting system with a reduction of the manufacturing cost.

I claim:

1. A heat source movement detecting system comprising:

a sensor section including infrared detecting means for detecting change in temperature in a heat source;

means for dividing the area to be observed by said infrared detecting means into a plurality of zones;

means for overlapping at least two of said zones to form (a) at least one overlap zone comprising said at least two zones and (b) single zones without overlap; and discriminating means for judging the movement of the heat source between at least one of the single zones and the at least one overlap zone and between different single zones;

said heat source movement detecting system being able to detect the movement of the heat source over the area to be observed by said sensor section by judging the movement of the heat source between at least one of the single zones and the at least one overlap zone, and between different single zones;

wherein said infrared detecting means comprises at least two infrared sensors X and Y, the dividing means divides the area to be observed by said infrared sensor X into at least three single zones A, B and C and the area to be observed by said infrared sensor Y into at least three single zones a, b and c, said overlapping means combines said single zones A and a to form an overlap zone (A, a), and said discriminating means is able to judge the movement of the heat source between the single zones B and b, between the overlap zone (A, a) and the single zone B, and between the overlap zone (A, a) and the single zone b, wherein said heat source movement detecting system can detect the movement of the heat source over the entire area observed by said sensor section.

2. A heat source movement detecting system as defined in claim 1 wherein the infrared detecting means comprises at least two pyroelectric type infrared sensors.

3. A heat source movement detecting system as defined in claim 1 wherein said dividing means is in the form of a Fresnel lens.

4. A heat source movement detecting system as defined in claim 2 wherein said dividing means is in the form of a Fresnel lens.

5. A heat source movement detecting system as defined in claim 1, wherein the overlapping means forms a plurality of overlap zones and the discriminating means judges the movement of the heat source between different overlap zones.

6. A method of detecting the movement of a heat source over an entire area to be observed, the method comprising the steps of:

providing a sensor section including infrared detecting means for detecting change in temperature in the heat source;

dividing the area to be observed by said sensor section into a plurality of zones;

overlapping at least two of said zones to form (a) at least one overlap zone comprising said at least two zones and (b) single zones without overlap; and judging the movement of said heat source between at least one of the single zones and the at least one overlap zone, and between different single zones;

wherein said infrared detecting means comprises at least two infrared sensors X and Y, the dividing step comprises dividing the area to be observed by said infrared sensor X into at least three single zones A, B and C and the area to be observed by said infrared sensor Y into at least three single zones a, b and c, said overlapping step comprises combining said single zones A and a to form an overlap zone (A, a), and discriminating means for judging the movement of the heat source between the single zones B and b, between the overlap zone (A, a) and the single zone B, and between the overlap zone (A, a) and the single zone b, wherein said method of detecting can detect the movement of the heat source over the entire area observed by said sensor section.

7. A method as defined in claim 6 wherein the infrared detecting means comprises at least two pyroelectric type infrared sensors.

8. A method as defined in claim 6 wherein said dividing step utilizes Fresnel lens means.

9. A method as defined in claim 7 wherein said dividing step utilizes Fresnel lens means.

10. A method as defined in claim 6, wherein the overlapping step includes forming a plurality of overlap zones and the judging step includes judging the movement of the heat source between different overlap zones.

* * * * *